C. H. PERKINS.
Pipe-Coupling.
No. 199,312.  Patented Jan. 15, 1878.
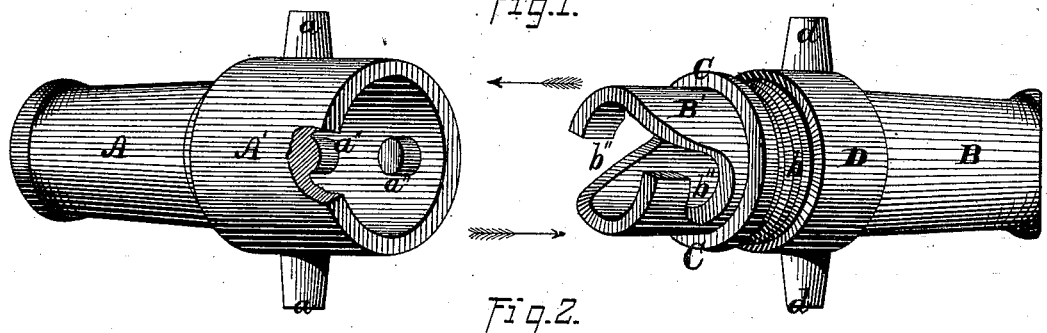
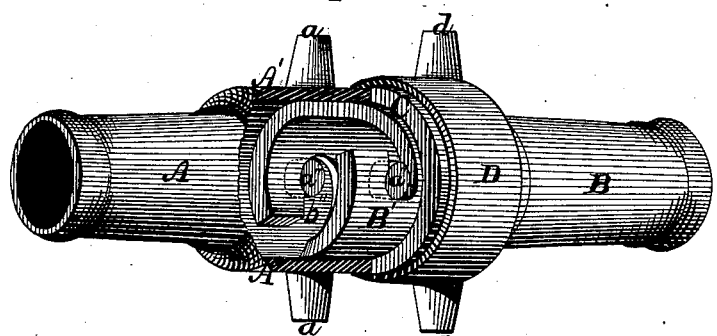
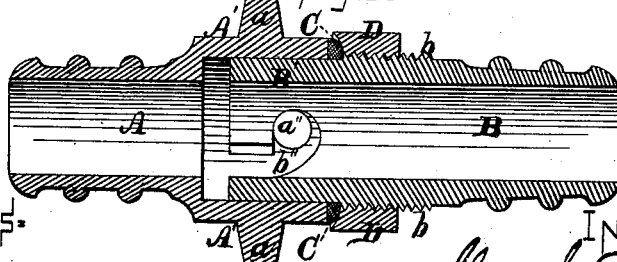
WITNESSES.
Jas. E. Hutchinson.
Henry C. Hazard.
INVENTOR.
Chas. H. Perkins, by
Prindle and Co. his Attys

UNITED STATES PATENT OFFICE.

CHARLES H. PERKINS, OF BLOOMINGTON, ILLINOIS.

IMPROVEMENT IN PIPE-COUPLINGS.

Specification forming part of Letters Patent No. 199,312, dated January 15, 1878; application filed April 30, 1877.

*To all whom it may concern:*

Be it known that I, C. H. PERKINS, of Bloomington, in the county of McLean, and in the State of Illinois, have invented certain new and useful Improvements in Pipe-Couplings; and do hereby declare that the following is a full, clear, and exact description thereof, reference being had to the accompanying drawing, making a part of this specification, in which—

Figure 1 is a perspective view of my coupling, the parts being separated from each other. Fig. 2 is a like view of said coupling with its parts united, a portion of the female section being broken away to show the relative position of the interior parts; and Figs. 3 and 4 are central longitudinal sections, and show, respectively, the screw-sleeve withdrawn from and in position against the packing-ring or gasket.

Letters of like name and kind refer to like parts in each of the figures.

The design of my invention is to enable hose or other pipe to be easily and quickly connected together or detached; and to this end it consists, principally, in the employment of a gasket of compressible material, and a screw sleeve or follower for packing the joint between the end of the female section and the periphery of the male section, substantially as and for the purpose hereinafter shown.

It consists, further, in the coupling as a whole, its several parts being constructed and combined to operate in the manner and for the purpose substantially as hereinafter set forth.

In the annexed drawing, A represents a short section of pipe, provided at one end with an enlargement, A′, which has about one-half greater diameter than the main portion of said pipe, and is provided upon opposite sides with two radial studs, a″, as seen in Fig. 1.

Interiorly the pipe corresponds in shape to its exterior conformation, the portion of said interior within the enlargement A′ being of such dimensions as to enable it to receive a pipe which corresponds in size to the opposite end of the section, said device constituting the female section of my coupling. The male section consists of an outer end, B, that corresponds in size and conformation to the outer portion A of the female section, and an inner end, B′, which fits loosely into the inner end A′ of the same, and upon its periphery is provided with an enlarged threaded portion, b, that terminates in a square shoulder, b′, that is nearly in contact with the end A′ of said female section when said end B′ is inserted within the same.

Within the portion B′ of the male section which enters the enlargement A′ are provided two slots, b″, that commence at equidistant points within its periphery, near the shoulder b, and extend in the same circumferential direction for a short distance, and from thence curve outward to the end of the section.

Two pins, a″, which are somewhat less in diameter than the dimensions of the slot b″, project radially into the interior of the enlargement A′, and are relatively arranged to engage with said slots whenever the portion B′ of the male section is placed within said enlargement, and by such engagement to confine said sections firmly in relative longitudinal position.

To connect the sections, the slotted end B′ is inserted within the enlargement A′, and turned in a forward direction, so as to cause the slots b″ to pass over the pins a″, while the disengagement of said parts is effected by turning the male section in an opposite direction.

In order that the joint between the coupling-sections may be made water or steam tight, a gasket, C, composed of rubber, leather, or other like material, is placed between the shoulder b′ of the male section and the contiguous end of the female section, and a sleeve, D, threaded interiorly, is fitted upon the threaded portion b of said male section, said sleeve or nut being provided with radial pins d, or other suitable means whereby it may be rotated.

If, now, the sleeve-nut D is turned forward so as to firmly compress the gasket C between its end and the end of the female section, said gasket will effectually close the space between said female section and the male section, and render the same proof against leakage.

The peripheries of the outer end of the coupling-sections are each provided with one or more concentric ribs, which enable hose to be more securely connected therewith than would be possible if said peripheries were plain.

The coupling described is easily and quickly connected or disconnected. Its parts are few and simple, and it is not liable to injury or derangement from use.

Having thus fully set forth the nature and merits of my invention, what I claim as new is—

1. In combination with the sections, coupled as shown, the gasket C, interposed between the shoulder $b'$ and the end of the female section, and the sleeve-nut D, fitted upon the threaded portion $b$ of the male section, and capable of compressing said gasket, in the manner and for the purpose substantially as shown.

2. The hereinbefore-described coupling, composed of the female section A A′, provided within its enlarged end with the pins $a''$, the male section B B′, having the threaded enlargement $b$, shoulder $b'$, and curved slots $b''$, the gasket C, of compressible material, and the sleeve-nut D, said parts being constructed and combined to operate in the manner and for the purpose substantially as set forth.

In testimony that I claim the foregoing I have hereunto set my hand this 16th day of April, 1877.

CHARLES HENRY PERKINS.

Witnesses:
J. E. EASTMAN,
A. A. ACKERLY.